United States Patent [19]

Bedros et al.

[11] Patent Number: 4,658,428
[45] Date of Patent: Apr. 14, 1987

[54] IMAGE RECOGNITION TEMPLATE GENERATION

[75] Inventors: Renee Bedros, West St. Paul; Robert J. Schnell, Brooklyn Center, both of Minn.

[73] Assignee: Honeywell Inc., Minneapolis, Minn.

[21] Appl. No.: 755,874

[22] Filed: Jul. 17, 1985

[51] Int. Cl.[4] .......................... G06F 9/62; G06F 9/78; G06F 9/44

[52] U.S. Cl. ........................................ 382/30; 382/45; 382/46; 382/54; 382/25

[58] Field of Search ........................ 382/30, 45, 46, 44, 382/25, 28, 34, 54

[56] References Cited

U.S. PATENT DOCUMENTS

| | | | |
|---|---|---|---|
| 2,968,789 | 1/1961 | Weiss et al. | 382/25 |
| 3,613,082 | 10/1971 | Bouchard | 382/44 |
| 3,614,736 | 10/1919 | McLaughlin | 382/34 |
| 3,823,261 | 7/1909 | Bolsey | 178/6.8 |
| 4,019,173 | 4/1977 | Kono | 382/28 |
| 4,168,488 | 9/1918 | Evans | 382/46 |
| 4,303,947 | 12/1981 | Stoffel | 382/54 |
| 4,379,308 | 4/1905 | Kochovski et al. | 358/106 |
| 4,400,728 | 8/1923 | Lung | 358/93 |
| 4,412,121 | 10/1925 | Kremers et al. | 219/124.34 |
| 4,435,837 | 3/1984 | Abernathy | 382/45 |

Primary Examiner—Leo H. Boudreau
Assistant Examiner—A. Anne Skinner
Attorney, Agent, or Firm—Charles G. Mersereau

[57] ABSTRACT

A method and system for generating additional template images containing an object of interest in a plurality of defined orientations from a single stored digitized pixel matrix template image frame is disclosed by which the object of interest may be translated and rotated within the template frame and thereby presented in a variety of predetermined positions.

8 Claims, 7 Drawing Figures

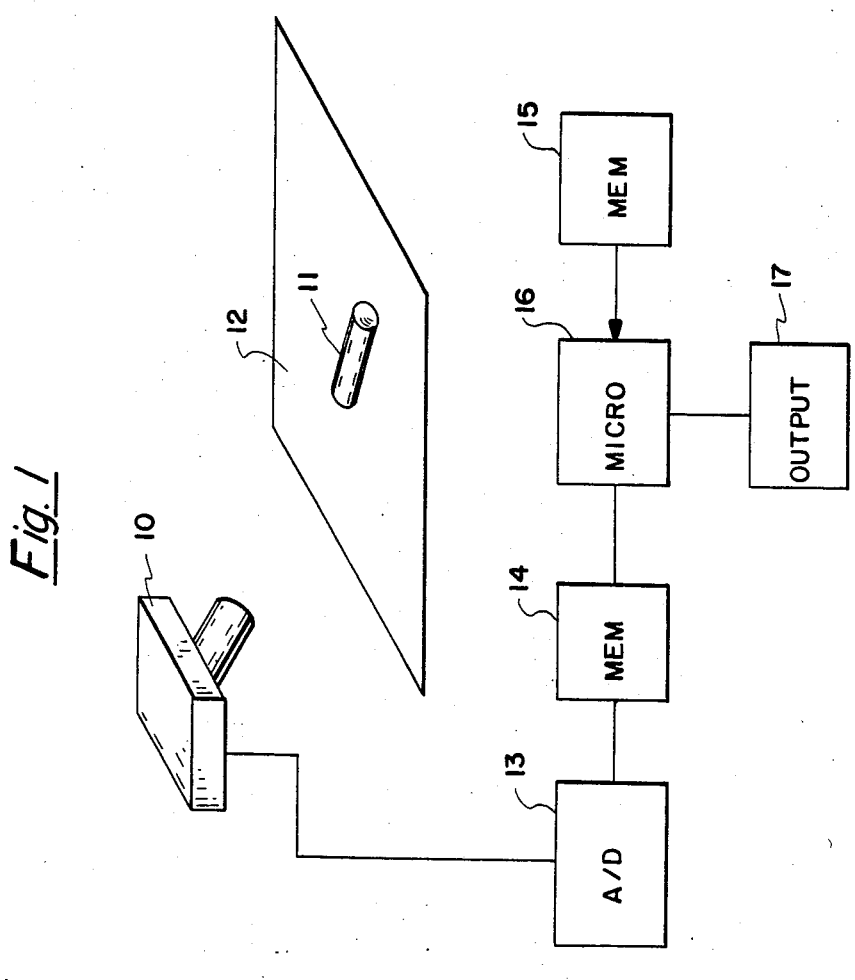

$X_I, Y_I$ – COORDINATES OF IMAGE PIXEL
$X_{IC}, Y_{IC}$ – COORDINATES OF IMAGE CENTROID
$\theta_I$ – ANGLE OF MAJOR AXIS OF BEST FIT ELLIPSE AROUND THE OBJECT

TRANSLATION TO THE ORIGIN:
$X_2 = X_I - X_{IC}$
$Y_2 = Y_I - Y_{IC}$

ROTATION OF $\theta_R$ AROUND THE ORIGIN:
$X_3 = X_2 \cos\theta_R - Y_2 \sin\theta_R$
$Y_3 = X_2 \sin\theta_R - Y_2 \cos\theta_R$ TRANSLATION TO $X_{tc}, Y_{tc}$:
$X_4 = X_3 + X_{tc} = X_t$
$Y_4 = Y_3 + Y_{tc} = Y_t$

IMAGE RECOGNITION TEMPLATE GENERATION

CROSS REFERENCE TO RELATED APPLICATION

Reference is made to co-pending application Ser. No. 755,873, entitled "Object Recognition Template Shifting" filed of even date and assigned to the same assignee as the present application. That application is directed to a quadrant shifting technique in which previously stored frames or templates depicting an object of interest in various orientations in one quadrant of a frame can be generated into templates depicting the object of interest disposed in each such orientation in any quadrant and in either front or reverse sides for comparison with an image of randomly disposed objects of interest to be identified and located in a field of view. The present application, on the other hand, discloses a system and method for frame or template generation wherein a plurality of templates of an object of interest depicting it in various desired orientations can be generated from a single random input image.

BACKGROUND OF THE INVENTION

1. Field of the Invention

The present invention relates to the field of image recognition or object identification and, more particularly, to a low cost image or template generation technique which reduces the number of input frames required to generate images of an object of interest in any desired orientation within a field of view.

2. Description of the Prior Art

In recent times robots have been introduced into the automated assembly of production parts in ever-increasing numbers. It is often necessary that a robot be able to pick up work pieces from a moving conveyor, for example, and correctly assemble them to a structure of interest. This requires that either the positioning of the work pieces relative to the robot be consistently precise or that the location and orientation of work pieces disposed at random be correctly identified and this information be communicated to the robot so that it may position the pick up accordingly.

Some automated identification systems exist in the prior art. For example, it has been possible to address machine parts or the like as with a video camera to produce a scan frame of the field of view. From this, a pixel scan may then be used to convert the frame into a series of binary bits on a pixel-by-pixel basis to produce a complete frame in memory. This stored "object" frame may then be compared to previously stored data in other frames to identify the part of interest and possibly its location and orientation in the frame in relation to the frame axes.

In order to properly procure meaningful location and orientation information pertaining to objects of interest randomly disposed within the field of view, however, it has heretofore been incumbent on such systems to compare the object image with an unwieldy amount of stored data. This has usually been in the form of numerous frames or "templates" portraying the object of interest in almost every conceivable position throughout the four quadrants of the field of view. While such a system is quite feasible, in addition to memory, it requires a great deal of high speed number-crunching capability, especially if operated on a real-time basis, and is therefore relatively complicated and very expensive.

It is readily apparent that a definite need exists to simplify aspects of a system of the class described such that the necessary tasks may be accomplished by easier, less costly means. This certainly applies to the generation of templates of the object of interest in various orientations to be compared later with an actual object of interest randomly disposed in the field of view.

SUMMARY OF THE INVENTION

The present invention simplifies template generation of images for use in the identification of objects of interest and determining their orientation in the field of view. This is accomplished from a single pictorial image by the provision of a low-cost image manipulation technique. The technique not only reduces the number of pictorial images which must be made to a single image, but it also significantly reduces the number of frames required to be stored in memory by enabling images of the object of interest to be produced from memory in a plurality of orientations in any given quadrant of the field of view.

In the preferred embodiment a single digitized image is created from a video frame of an object of interest disposed at random in the field of view by converting the frame into binary bits on a pixel-by-pixel basis. This sample image is then stored in memory and used to generate the desired templates. The object centroid coordinates are determined along with the slope or angle of the major axis of the best-fit ellipse around the object. Using the known centroid and major elliptical axis, the coordinates of the centroid may be translated and rotated as desired as a point in two-dimensional space to, in effect, position the image of the object of interest in any position desired. From this template the other templates of object of interest may be generated by a pixel-by-pixel translation and rotation of the single stored image. In one embodiment, eight images of the object are made with the major or long axis of the ellipse surrounding the object of interest at $11\frac{1}{4}°$ increments spaced evenly throughout the 90° quadrant. While any desired number can be used, eight images have been found to be adequate to identify most objects of interest.

BRIEF DESCRIPTION OF THE DRAWINGS

In the drawings:

FIG. 1 is a block diagram of the template generation system of the invention;

DESCRIPTION OF THE PREFERRED EMBODIMENT

Figure 2A:
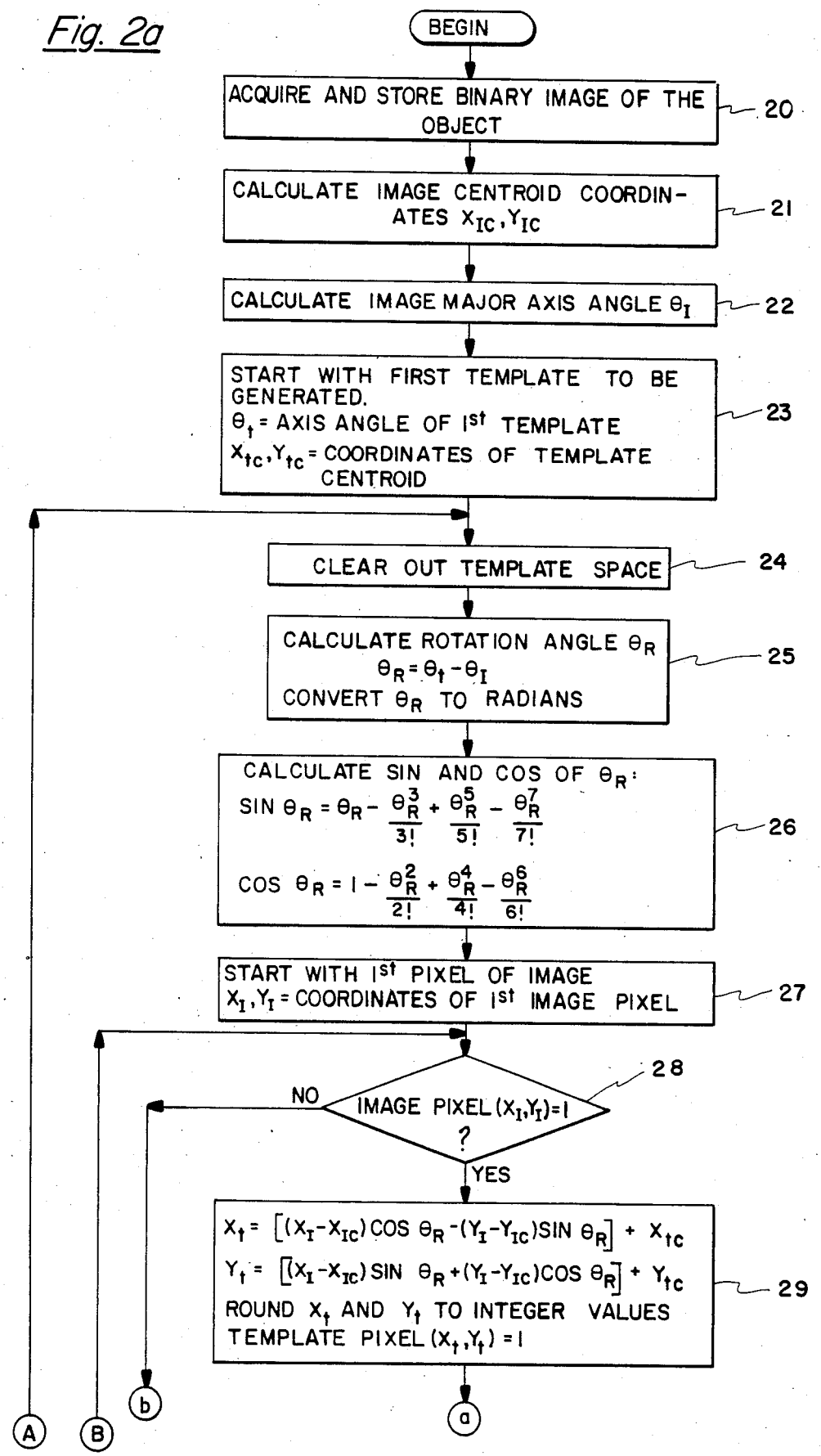
FIGS. 2a and 2b represent a logic diagram associated with the template generation system of the invention.

In order to overcome limitations associated with loss of precision due to the nature of the digitized image and to enhance the clarity of the generated image of the object of interest the technique of the present invention is also applied to the midpoints between pixels. This occurs when the pixel of interest is detected as an image pixel rather than a background pixel and is surrounded by image pixels. This increases the number of image pixels and successfully closes gaps which otherwise might occur in the image of the object of interest due to rounding off of values in processing the image because of the digitized nature of the image.

A matrix of any desired number of pixels can be used to produce the templates in accordance with the invention. While a greater number of pixels produces a better or clearer image of the object of interest, a larger matrix requires more memory and data processing capability. By using the technique of the present invention, however, it has been found that an initial matrix of 32×32 pixels processed in accordance with the invention produces sufficient clarity to facilitate correct identification of most objects of interest and it is sufficiently simple to allow real-time object identification.

FIG. 1 illustrates a typical imaging system including a video camera 10 for generating an image of an object to be used as a comparison norm 11 which may be randomly located in the field of view of the camera such as on a surface 12. The system further includes an analog to digital (A/D) converter 13 for digitizing the image, random access memories 14 and 15 for storing digitized data, a central processing unit (CPU) for controlling the system, which may be a microprocessor 16, and an output device 17.

The manual generation of a series of digital video frames depicting a comparison object of interest in a plurality of orientations for manual template generation has long been the standard used for comparison. This manual template generation is very difficult to do accurately and is very time consuming. It requires careful positioning of the object of interest in the field of view for each frame or template. Digitizing video pictures requires rounding off values of pixel intensity to whole integers resulting in a reduction of clarity. For this reason normally a series of several frames must be generated and digitized to accomplish the minimum accuracy required to produce one acceptable template in memory. An acceptable template must produce image edges with sufficient accuracy to allow reproducible recognition of like objects of interest later pattern recognition. In the past, this has required either a composite of several images as described above or utilization of a matrix having a great number of pixels as a 525×525 pixel video image used in broadcast television.

Figure 2B:
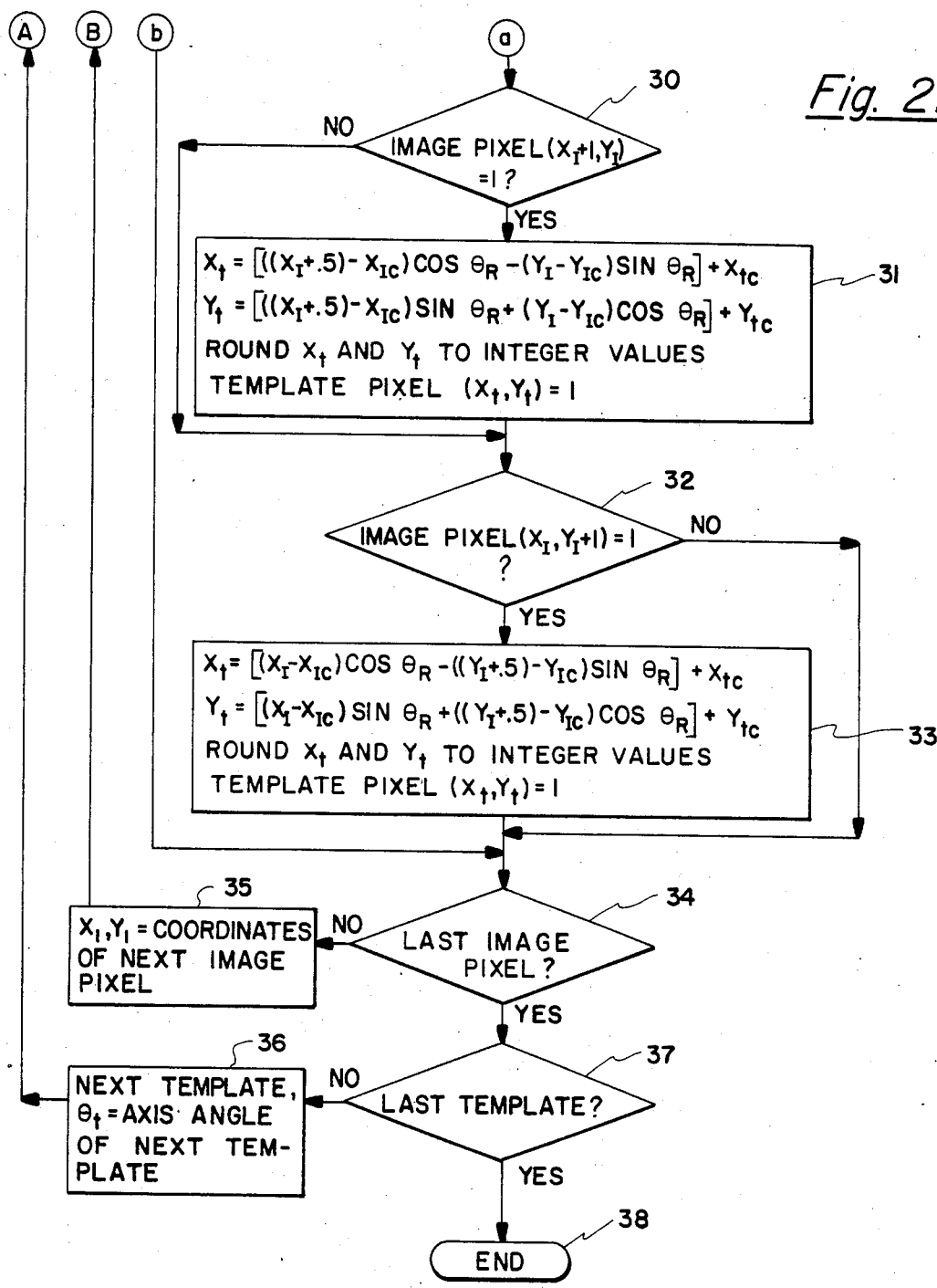

As mentioned above, the present invention greatly simplifies the process by eliminating the need for multiple manual template generation and allows the use of a smaller pixel matrix in achieving template generation portraying images of sufficient clarity to assure proper object identification. FIGS. 2a, 2b and 3a–3d illustrate the technique utilized in accordance with the present invention. FIG. 3 depicts the derivation of equations used for the translation or rotation of the image of an object of interest in a given quadrant of the field of view to produce desired image orientation. The logic sequence is shown in FIGS. 2a and 2b.

In accordance with the present invention, a video image frame pixel matrix containing the object of interest is digitized by the A/D converter 13 into a corresponding matrix of binary bits which is stored in memory in accordance with the step 20 of FIG. 2a. Based on the stored image data the centroid coordinates $X_{IC}, Y_{IC}$ are calculated at 21. This point is also illustrated at 50 in FIG. 3. Next the major image axis angle OI which represents the angle of the major axis of the best fit ellipse around the object is determined as at 22.

Figure 3A:
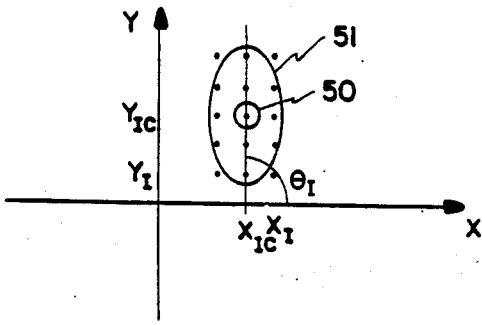
FIGS. 3a–3d illustrate the translation and rotation of the centroid coordinates of the image used in the template generation system of the invention.
Figure 3B:
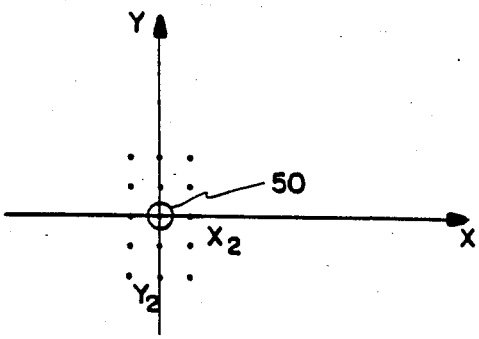
Figure 3C:
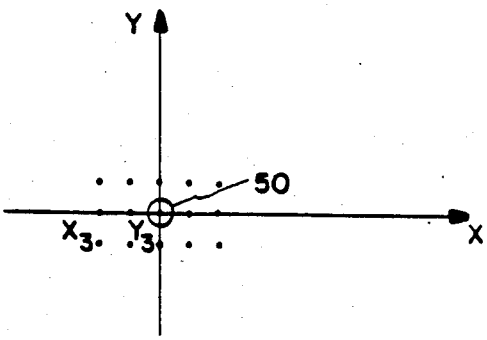
Figure 3D:
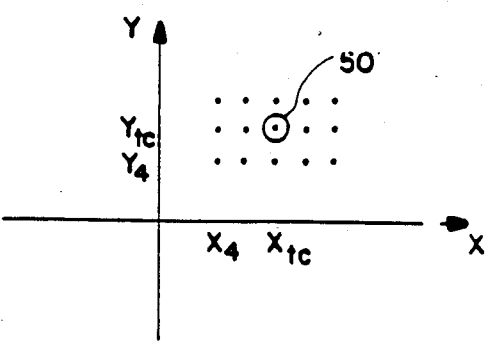

The derivation of the translation and rotational functions utilized in the invention is illustrated in FIGS. 3b–3d. FIG. 3b illustrates the translation of the coordinates of the centroid from the random location of the initial image to the axis origin. The equations represent the standard equations for the translation of an object in two-dimensional space to the origin. FIG. 3c illustrates the standard equations for the rotation of an object in two-dimensional space about the origin to any desired angle. FIG. 3c illustrates a 90° rotation. FIG. 3d represents a retranslation of the centroid pixel, and thus the image itself, in the rotated state back to the point in the quadrant which is desired.

Given the ability to translate and rotate the centroid pixel, $X_{IC}, Y_{IC}$ all the pixels in the matrix, images can then be generated in accordance with the equations to any desired angle at which the image of the comparison object is sought to be disposed. A first template can then be generated at angle $\theta_t$ which denotes the angle of the first template as shown at 23 of FIG. 2A. After this has been determined the entire image represented by the pixel matrix can be translated and rotated in accordance with the equations of FIGS. 3a–3d on a pixel-by-pixel basis.

A template space is first cleared in memory at 24 and the necessary parameters calculated at 25 and 26.

The image clarification technique of the invention will now be described. Starting at 27, the first scanned frame pixel $(X_I, Y_I)$ is evaluated at 28 as to whether it is an image or background pixel. If, in fact, it is determined to be an image pixel or a pixel pertaining to the comparison object of interest, it is further evaluated and the coordinate corresponding to the desired template determined by rotation and translation at 29. In addition, at 30, 31, 32 and 33 adjacent X and Y pixels are also evaluated as to whether they are properly part of the object image. Thus, for example, if the adjacent X pixel $(X_I+1, Y_I)$ is also an image pixel, the mid-pixel point $(X_I+0.5, Y_I)$ is then evaluated and used as an additional point at 32 and 33. Similar treatment is accorded the mid-pixel point for locations $(X_I, Y_I)$ and $(X_I, Y_I)$.

It should be noted that if pixel $(X_I, Y_I)$ is not an image pixel the system skips to 34 where the next image pixel or the next pixel is picked up at 35. This occurs until an actual object image pixel is found. Similarly, if an adjacent image pixel at 30 or 32 is found to be a background pixel that corresponding mid-pixel evaluation step is omitted. This continues until the last pixel of a frame is evaluated at which time the template is complete and the system is set up to generate the next template via 35 and 36 or the sequence ends with the last template at 37.

This enables a series of templates as desired to be generated from the single stored image rather simply and inexpensively. These images can be stored for later comparison with a template containing the image of an object of interest whose identity and orientation are sought to be determined. The above cross-referenced application allows images representing but one of the four quadrants to be used to represent all four quadrants and either the front or reverse side of the object of interest by quadrant shifting and may be used in conjunction with the present invention to further simplify an entire object recognition system.

The embodiments of the invention in which an exclusive property or right is claimed are defined as follows:

1. A system for generating additional template images containing an object of interest, having an angle associated with the major axis of the best-fit ellipse around said object, in a plurality of defined orientations from a single digitized template image frame containing said object of interest comprising:

means for generating a first digitized pixel template of a frame containing an object of interest in the form of object and background pixels, wherein said frame is divided into four quadrants by perpendicular reference axes;

storage means for storing said first digitized template;

means for locating the centroid object pixel which is the pixel located closest to the geometric centroid of the object of interest in said first digitized template;

means for determining the angle of the major object axis, wherein said major object axis is defined as the major axis of the best-fit ellipse around said object of interest in said first digitized template;

means for translating said centroid pixel to a desired position in a quadrant of the frame with respect to said perpendicular reference axes dividing said frame into quadrants;

means for rotating said angle of said major object axis to a desired second angle in a quadrant of said template frame;

means for generating a second digitized pixel template of said frame containing said object of interest disposed in a second position with respect to said perpendicular reference axes of said frame;

means for enhancing the clarity of said object of interest in said second digitized pixel template.

2. The system of claim 1 including means for generating additional digitized pixel templates containing said object of interest from said first digitized pixel template wherein said major object axis is disposed at additional defined angles.

3. The system of claim 1 wherein eight such digitized pixel templates are generated at increments of $11\frac{1}{4}°$ intervals in a said quadrant of said frame.

4. The system of claim 1 wherein said digitized pixel templates are generated on a pixel-by-pixel basis.

5. The system of claim 1 wherein said means for enhancing the clarity of said object of interest in said second image frame further comprises means for accounting for inter-pixel gaps by determining whether pixels neighboring object pixels are also object pixels and if so incrementing the pixel scan to the midpoint location between adjacent object pixels rather than incrementing it to the next pixel.

6. A method for generating additional template images containing an object of interest, having an angle associated with the major axis of the best-fit ellipse around said object, in a plurality of defined orientations from a single digitized pixel template image frame containing said object of interest comprising the steps of:

generating a first digitized pixel template of the frame containing the object of interest, wherein said frame is divided into four quadrants by perpendicular reference axes;

storing said first digitized image in the form of binary pixel values representing background and object pixels;

determining the centroid object pixel which is the pixel located closest to the geometric centroid of the object of interest in said first template;

determining the angle of the major axis of the best-fit ellipse around said object of interest in said first template;

translating said centroid pixel to a desired position in a quadrant of the frame with respect to said perpendicular reference axes dividing said frame into quadrants and rotating said angle of said major object axis to a second determined angle in said quadrant of said template in which said object of interest is disposed;

generating a second digitized pixel template of said frame containing said object of interest disposed in said second position with respect to said perpendicular reference axes of said frame;

enhancing the clarity of said object of interest in said second digitized pixel template.

7. The method of claim 6 including the step of generating additional digitized pixel templates from said first digitized pixel template by changing the major object axis of said object of interest within the quadrant.

8. The method of claim 6 wherein the step of enhancing the clarity of said object of interest in said second image frame comprises accounting for inter-pixel gaps by determining whether pixels neighboring object pixels are also object pixels and if so incrementing the pixel scan to the midpoint location between adjacent object pixels rather than incrementing to the next pixel.

* * * * *